United States Patent [19]

Shipman, Jr. et al.

[11] Patent Number: 4,665,526
[45] Date of Patent: May 12, 1987

[54] MINIMUM INDUCTANCE LASER HEAD FOR PULSED TRANSVERSE DISCHARGES WITHOUT WALL TRACKING

[75] Inventors: John D. Shipman, Jr., Alexandria; Bernard L. Wexler, Arlington, both of Va.

[73] Assignee: The United States of America as represented by the Secretary of the Navy, Washington, D.C.

[21] Appl. No.: 863,285

[22] Filed: May 15, 1986

[51] Int. Cl.$^4$ ............................................. H01S 3/097
[52] U.S. Cl. ........................................ 372/83; 372/82; 315/111.21; 315/4
[58] Field of Search ....................... 372/83, 87, 82, 81; 315/4, 5, 111.21

[56] References Cited

U.S. PATENT DOCUMENTS 4,359,777  11/1982  Fox et al. ............................... 372/82

OTHER PUBLICATIONS

Abstract of THQ4 "Elimination of Surface Tracking for Low Inductance Laser Head Design", B. L. Wexler, A. P. desRosiers, and J. D. Shipman, published in Advance Program for CLEO 85, distributed before May 23, 1985.
Synopsis of THQ4 "Elimination of Surface Tracking for Low Inductance Laser Head Design", B. L. Wexler, A. P. desRosiers, J. D. Shipman, distributed at CLEO 85, held May 21–24, 1985.
"Water Dielectric Pulse Power Driver for Rare-Gas-Halide Lasers", J. D. Shipman, Jr., B. L. Wexler and W. H. Lupton, presented at the 5th IEEE Pulsed Power Conference, Arlington, Virginia, held Jun. 10–12, 1985.

Primary Examiner—Léon Scott, Jr.
Attorney, Agent, or Firm—John L. Forrest; Andrew M. Lesniak

[57] ABSTRACT

Four broad metal vanes form two pairs of contoured metal sheets arranged symmetrically about orthogonal planes of a discharge device to provide a uniform and properly shaped electric field for a discharge region between opposed slab electrodes situated between upper and lower pairs of the vanes in proximity to electrode edges. The electrodes border the region inside a housing having dielectric wall portions interposed between broad surface portions of the vanes and the discharge region located intermediate the electrodes. The electric field is delineated by the vanes so as to inhibit discharge tracking on the wall portions bounding the discharge region.

22 Claims, 4 Drawing Figures

MINIMUM INDUCTANCE LASER HEAD FOR PULSED TRANSVERSE DISCHARGES WITHOUT WALL TRACKING

BACKGROUND OF THE INVENTION

This invention relates to transverse discharge devices and particularly to such devices for use with lasers.

Discharge devices used in excimer gas lasers have had two slab electrodes connected to a power supply by means of two separate current carrying members disposed outside the device housing containing the slab electrodes and the discharge region between the electrodes. One member runs from one device electrode down along both sides of the device while another member runs from another device electrode with both members running beyond the last mentioned electrode. This device geometry involves power feed to the electrodes along a path that has an adverse effect on an electric field formed between the device electrodes in the discharge region. Such a device is called a transverse discharge device because the discharge between the electrodes is transverse to the device's optical axis.

Transverse discharge devices, particularly those incorporated into gas lasers, have an inductance that can degrade laser performance. Past efforts to minimize this inductance have involved making the device walls enclosing the discharge region as close as possible to the edges of the opposed slab electrodes separated by the length of preferred discharge path in the region. However, mere proximity of any inside wall surface to the discharge suffices to cause a flashover of an initiated discharge to such surface and tracking of the discharge along such wall surface to a discharge electrode; the discharge thus follows a route other than a path through the discharge region from one electrode to another. This process limits the compactness of the device. Various attempts have been made to overcome this problem with only limited success.

Prior attempts to overcome the problem of discharge tracking involved designing devices to make the wall track length an arbitrarily large multiple of the preferred discharge path length. In small volume laser discharge devices (for example, in excimer lasers) this design approach works and poses no new problem inasmuch as the devices being small sized have inductance that remains acceptably low. However, as the volume of the laser discharge region increases in size, above about 3 liters, device inductance rapidly increases to become so great as to impair efficient laser operation. Techniques utilized heretofore in these prior attempts to overcome the problem maintained the discharge track length at some multiple of the length of the preferred discharge path. In a Xenon Chloride (XeCl) laser discharge device of most common geometry this multiple has been empirically found to be 3.

Other techniques involve grooving or serrating the wall surface whereon unwanted discharge tracking ordinarily takes place, to increase track length. Yet another technique involves anti-tracking bars affixed to the wall surface, again, to increase track length. Both techniques are limited, although useful in certain devices, and do not provide entirely predictable results. Antitracking bars in particular are very limited in utility, due to a tendency of an initiated discharge to flashover from a point of origination in a discharge region at or near a high potential electrode to the bars, then travel to a ground electrode by tracking along the wall surface(s). "Punch through" can occur if the bars are not tightly sealed to the wall and defeats the bars' purpose as discharge tracking occurs on the wall under the bars. Grooved walls, likewise, suffer a similar drawback; that is, a tendency of a discharge to flashover from an electrode edge to a wall surface and then track. This is evidence that increased track length by itself is inadequate to inhibit problemsome discharge tracking, unless the wall surface is kept at a distance far from an electrode edge. As this distance increases, the problem of increased device inductance reappears.

The above techniques can be contrasted with electric field shaping techniques utilized recently in various devices One device design utilizes metal vanes outside a cylindrical housing to modify an electric field in a discharge region between two slab electrodes. These vanes flank both sides of a housing of dielectric material, such as plastic, and helps shape the electric field in the region. Without this field modification an extra high intensity field exists in the space surrounding both long edges of the driven electrode. The field intensity in this space is much higher than the average field intensity in the rest of the discharge region. Analysis indicates that such "enhancement" of field intensity in a localized portion of the field will cause a discharge corona to occur from which a discharge will travel from an electrode edge to the laterally adjacent wall surface. The direction of the localized high field will accelerate any charged particle, particularly a negatively-charged electron, toward the wall surface, also leading to undesired discharge tracking. When the shield is fitted onto the housing the shield acts electrostatically on the discharge region, so that the potential difference between the electrode and the nearby wall is eliminated, because the shield is electrically connected to the electrode. However, even this shield does not entirely eliminate unwanted field enhancements. Argon gas put into the discharge region shows the unwanted discharge tracking even though a XeCl mix (a mixture of Xe, HCl, and Ne) in the discharge region is free of discharge tracking. Argon is most susceptible to discharge tracking and poses a severe test of this device design. Thus, reducing the electric field that initiates a discharge has merit, yet is not, in and of itself, entirely successful in avoiding the tracking phenomenon. Control of electric field intensity and gradient throughout all field portions should be a design criteria, if electrostatic shielding is to solve the problem.

SUMMARY OF THE INVENTION

Accordingly, an object of the invention is to provide a transverse discharge device structured to overcome various and sundry problems found with earlier device designs.

Another object of the invention is to provide a transverse discharge device structured to have low inductance and optimal electrical field configuration.

Another object of the invention is to structure a transverse discharge device so as to inhibit discharge tracking on housing walls bounding a discharge region.

Another object of the invention is to provide an electric field in a discharge region, so as to eliminate so-called field "enhancements" that promote discharge tracking.

Still another object of the invention is to shape an electric field, using conducting vanes, so that no charged particles in the field are accelerated in a wrong.

direction toward any surface bounding a discharge region intermediate two discharge electrodes.

Still another object of the invention is to provide a transverse discharge device having means to entirely eliminate wall tracking by any discharge, by using metal vanes that feed energy into the electrodes from opposite sides, perpendicular to the gas discharge.

Still another object of the invention is to provide a low-inductance transverse laser discharge device having vanes of metal, or other electrical conductor material, for modifying in a favorable way an electric field in a discharge region.

Yet another object of the invention is to provide contoured vanes flanking both edges of one or more slab electrodes confronting a gas-filled discharge region laterally bounded by dielectric material interposed between the vanes and the region and to shape the dielectric material so that it also optimizes the electric field imposed upon the region. The contoured vanes slope away from the discharge region to delineate field size, shape, intensity distribution and gradient (as measured by equipotential lines) and connect the large discharge region with the smaller spaced transmission lines, which supply power to the discharge.

Yet another object of the invention is to utilize metal vanes arranged in two symmetrical pairs disposed about a pair of discharge electrodes separated by a discharge region so that the vanes prevent discharge flashover to nearby housing walls of a large volume transverse discharge device designed to possess mininal inductance.

Yet another object of the invention is to utilize metal vanes in spaced relation to discharge electrodes to impart a desired shape to an electric field in a discharge region between the electrodes as a voltage difference is applied across the electrodes and a discharge is initiated.

Other objects, advantages, and novel features of the invention will become apparent from the following detailed description of the invention.

The invention provides a transverse discharge device having two pairs of identically contoured conducting vanes symmetrically arranged about a discharge region located between two slab electrodes and a dielectric wall material interposed between the vanes and the discharge region. The vanes delineate an electric field formed in the discharge region when discharge initiation is effected, for example, by applying a potential difference across the electrodes. Contouring of the vanes to the dielectric wall material produces sloped vanes that give shape to the electric field and impart favorable field intensities and gradients to the field throughout its entirety so that discharges will not track along any wall of dielectric material bounding the discharge region. Companion vanes alongside the discharge region and separated therefrom by dielectric wall material deliver power to the device electrodes and hence carry current through a low inductance loop formed by the sloped companion electrodes and the discharge regions between the electrodes. The vanes flanking the electrodes slope to produce the desired field shaping and to match the narrower spacing of the flat plate transmission feed lines. The companion vanes converge rapidly to minimize tube inductance. In a typical device two vanes connected to one electrode and two other vanes connected to another electrode carry current and deliver power to the discharge region via the electrodes.

The transverse discharge device structure provided by this invention comprises dielectric wall material encapsulating a discharge region; two discharge electrodes in the region, and means in the form of companion conducting vanes alongside one or both sides of the device for imparting a particular configuration to an electric field in the region while carrying current to both device electrodes to feed power to the device. The companion vanes are contoured to produce the desired result and, in certain cases, may be of flat or planar contour, or, in other cases, be of sloping contour, as described in this specification.

The discharge device structure provided by this invention is not limited to application in transverse discharge laser devices. Thus, the invention provides a discharge device structure comprising dielectric wall material forming a housing about a discharge region; two discharge electrodes disposed in spaced relation within the region; and means in the form of one or more pairs of conducting vanes for imparting a particular configuration to an electric field in the region. The field is characterized by a pattern of equipotential lines that is essentially free of field enhancements that would accelerate charged particles from the discharge region toward the dielectric wall material. The vane, or vanes are situated outside the housing where they have favorable impact on the electric field resident in a portion of the region proximal an edge of a nearby discharge electrode.

DESCRIPTION OF THE PREFERRED EMBODIMENTS

Figure 1:
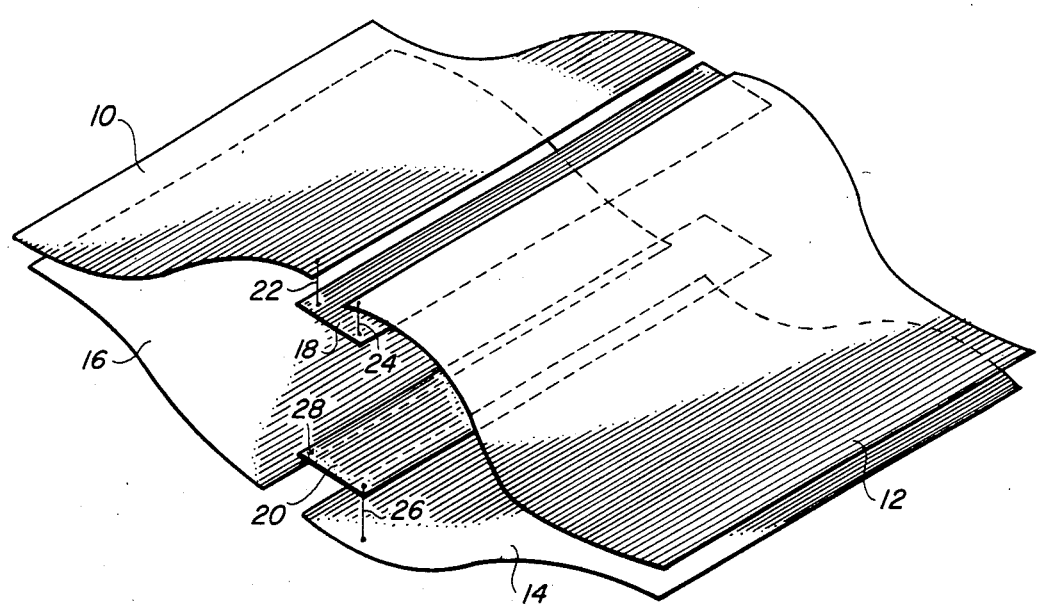
FIG. 1 is a schematic diagram of a set of four vanes and a pair of slab electrodes arranged to create an electric field in a discharge region between the electrodes.

FIG. 1 shows an arrangement of four metal vanes 10, 12, 14, and 16 and two slab electrodes 18 and 20. Upper vanes 10 and 12 connect to upper electrode 18 via conductive elements represented by conductive lead wires 22 and 24, and lower vanes 14 and 16 connect to lower electrode 20 via conductive elements represented by conductive lead wires 26 and 28. Upper vanes 10, 12 must connect to the electrode 18 so that no potential difference exists between them and the electrode which is at high potential under operating conditions. Lower vanes 14, 16 are shown connected to electrode 20 which is at ground potential under operating conditions, so that no potential difference exists between them and the electrode. Upper vanes 10 and 12 are a pair of identically shaped members disposed symmetrically about upper electrode 18; and, likewise, lower vanes 14 and 16 are another pair of identically shaped members disposed symmetrically about lower electrode 20. One vane pair 10, 12 has proximal vane edges near respective lateral edges of electrode 18. Another vane pair 14, 16 has proximal edges near respective lateral edges of electrode 20. Vanes 10 and 16 are companion vanes near left edges of electrodes 18 and 20 and, likewise, vanes 12 and 14 are companion vanes near right edges of electrodes 18 and 20. Electrodes 18 and 20 are centered between both sets of companion vanes.

Each vane is sized, shaped and located with reference to a discharge region situated intermediate electrodes 18 and 20. Each vane provides electric field shaping for the discharge region to accomplish the aims of the invention, as will be explained later. An important relation exists between the geometry of the vanes, the electrodes, and the discharge region. The vanes are broad so that they are as wide or wider across as the slab electrodes are long. Wide vane edges closest to the electrodes' edges are shown in FIG. 1 in vertically overlapping relation to the corresponding nearby electrodes, but such need not necessarily be the case in a physical embodiment of the invention. Vane configuration plays an important role in the invention, and complements slab electrode geometry. Each broad vane is contoured to a desired shape and has a sloping portion such that companion vanes have closely spaced parallel portions remote from the discharge region between the electrodes near a horizontal plane bisecting the vane and electrode arrangement. Vane pairs 10, 12 and 14, 16 have closely spaced marginal edges in the vicinity of respective electrodes 18, 20 and portions sloping away from such electrodes. The vane's sloping surfaces diverge gradually so that they do not come close to the center of the discharge region as they run away from an electrode. The companion vanes 12, 14; 10, 16 diverge as they approach the respective electrodes 18, 20 and the discharge region between the electrodes.

A housing of dielectric material, or materials, maintain the vanes and electrodes in a particular geometry and separate the vanes from the discharge region. The housing walls interposed between the vanes and the discharge region have a configuration suited to the geometry of the vanes, the electrodes, and the discharge region.

Rare gas halide lasers incorporating the transverse discharge device described herein above are a genre of lasers that provide immediate application for the device. Krypton-Fluoride (KrF) and Xenon-Chloride (XeCl) are two examples of rare gas halides that may be used in the device discharge chamber.

Figure 2:
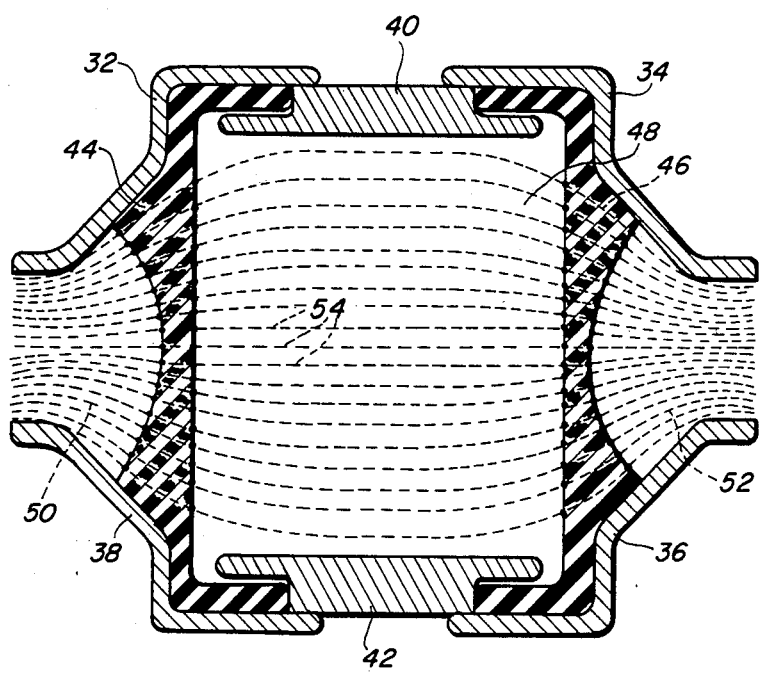
FIG. 2 is a transverse cross-section of a discharge device forming one invention embodiment.

An embodiment of the invention is shown in FIG. 2 wherein a long housing of rectangular cross-section is shown. A pair of upper vanes 32 and 34 and a pair of lower vanes 36 and 38 laterally surround respective slab electrodes 40 and 42. These vanes are made of sheet or plate material. The material thickness is not drawn to scale. The housing has an upper wall, a lower wall, a left side wall 44 and a right side wall 46. A discharge region 48 intermediate slab electrodes 40 and 42 is laterally bounded by the walls 46 and 48. Opposed electrodes 40 and 42 are supported by the respective top and bottom walls. Connection is made between vanes 32, 34 and electrode 40, and likewise between vanes 36, 38 and electrode 42, so that no voltage difference can arise between a vane and the electrode to which it is electrically connected. Companion vanes 32, 38; 34, 36 are sloped to follow sloping contours of side walls 44, 46 flanking discharge region 48. They continue laterally outward from the sides of the housing in spaced parallel relation to each other. Companion vanes 32, 38; 34, 36 have portions that are separated by water dielectric 50, 52 within a bath of water (not shown). Each side wall 44, 46 is dished lengthwise on its exterior surface to maintain the desired field shape through the interface of materials with different dielectric constant. This dishing also acts as an arch in providing structural strength for the side walls which must be able to withstand high internal pressures since discharge region 48 is filled with the pressurized gas of an excimer laser. Water was the desired dielectric for this device but is not part of this invention.

Equipotential lines 54 represent an electric field orthogonal to lines 54. Field intensity in any portion of the field is inversely proportional to the spacing between any two lines. Examination of the equipotential line pattern indicates that the electric field intensity near lateral electrode edges is actually lower than elsewhere in the field and that field intensity is highest midway between electrodes 40 and 42. This is an optimum field condition favoring a discharge free of deleterous wall tracking when discharge is initiated by applying a voltage difference across electrodes 40, 42. The field is shaped to such an extent that no electron, or other charged particle, within discharge region 48 will be accelerated to a wall surface, and, as a result, no discharge will track on the wall but, once initiated, will follow a preferred discharge path that does not touch any wall surface.

The side walls, 44, 46 are specially shaped so that in conjunction with the shaping action of the four vanes 32, 34, 36, 38 and the electrodes 40 and 42, the desired field geometry is achieved. The walls 44, 46 serve to maintain the vanes in the described geometry.

The housing is bounded on opposite ends by axially aligned end mirrors that form an elongated laser optical cavity. One mirror is a full reflecting mirror, the other is a partially reflecting mirror. The laser cavity works in a known way to send a coherent light beam from the cavity via the partial mirror.

Figure 3:
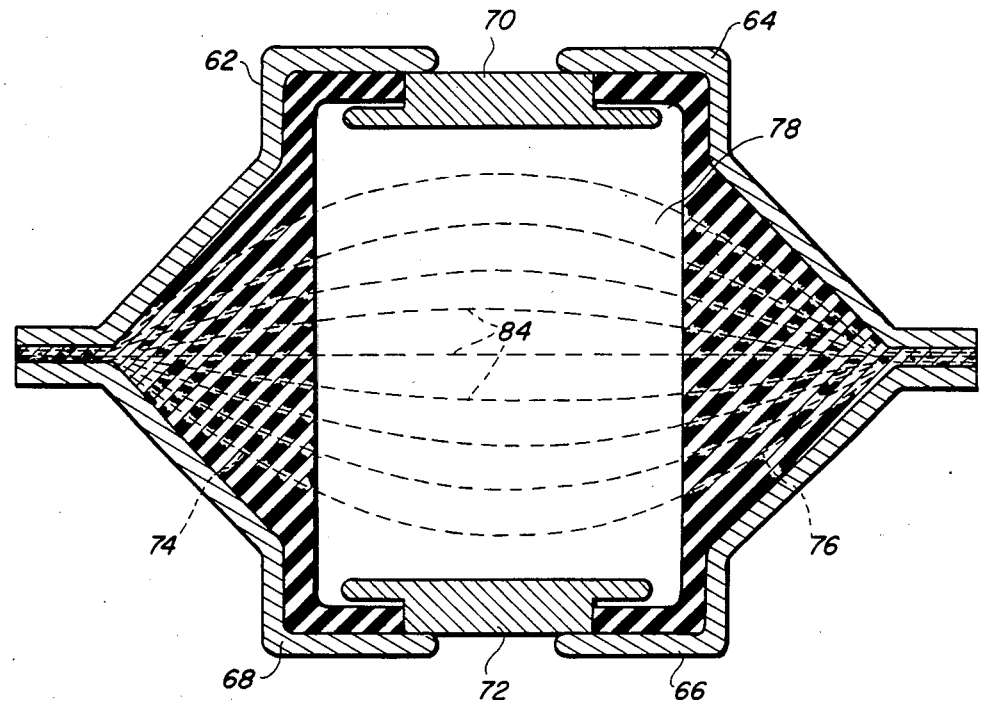
FIG. 3 is a transverse cross-section of another discharge device forming another invention embodiment.

An embodiment of the invention is shown in FIG. 3 wherein a long housing of rectangular cross-section is shown. Vane pair 62, 64 and vane pair 66, 68 laterally surround respective slab electrodes 70, 72. Housing walls include a left side wall 74 and a right side wall 76 that flank a discharge region 78. Side walls 74, 76 are tapered in thickness to include outwardly flared middle portions forming two sloping surfaces. Vanes 62, 64, 66, and 68 are made of then conducting plate material, such as sheet aluminum. The material thickness is not drawn to scale in FIG. 3. The vanes follow the sloping surfaces of side walls 74, 76 and continue on to diverge and make direct electrical contact to electrodes 70, 72 respectively, as shown in FIG. 3. The vanes slope laterally outward, following the sloping side walls 74, 76. Companion vanes 62, 68 and 64, 66 are respectively separated by electric insulation material to form a metal-insulator-metal sandwich. Equipotential lines 84 of an electric field created, to initiate a discharge, by applying a large positive or negative voltage to electrode 70 and by grounding electrode 72, indicate that each vane coacts with the other vanes to delineate the field in terms of size, shape, location, polarity, and intensity distribution (gradient).

The device structure shown in FIG. 3 represents the use of solid dielectric material alone. FIG. 2 shows the use of solid and liquid (water) dielectric material together to form, in effect, housing walls. In fact, dielectric wall material comprised of solid, liquid, gas, or a combination of them, is contemplated as within the ambit of the invention which simply requires any dielectric material(s) of desired dielectric constant(s) to actively confine the device discharge region so as to bound the region within spatial limits.

Figure 4:
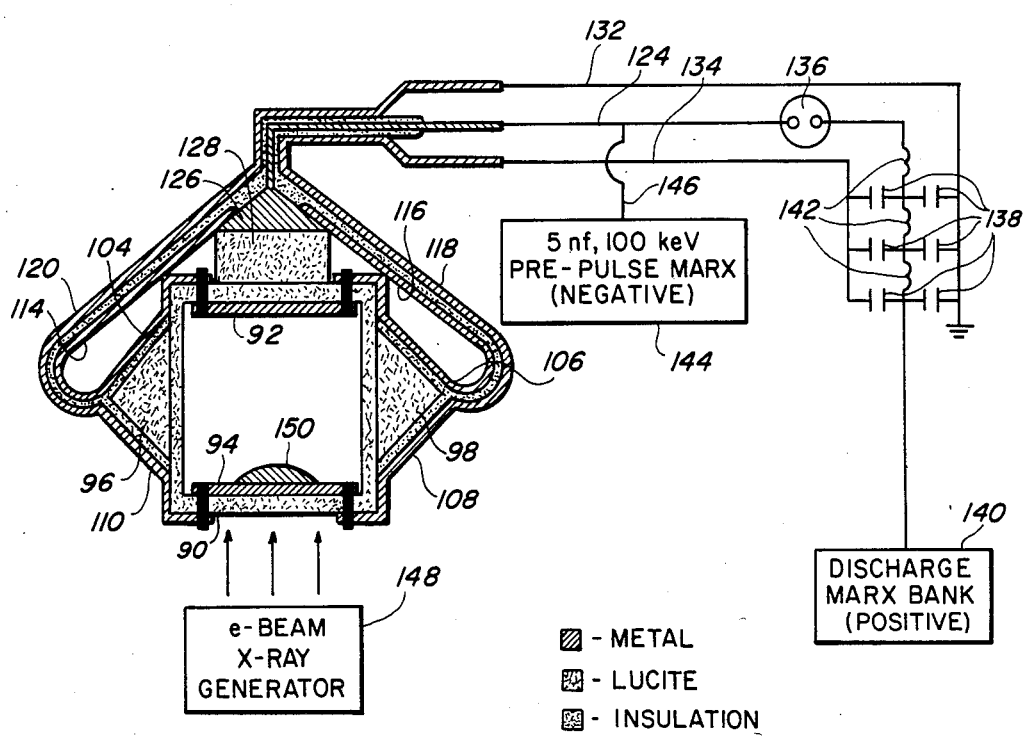
FIG. 4 is a circuit diagram containing a transverse cross-section of yet another device forming still another invention embodiment.

A third embodiment of the invention is shown in FIG. 4 wherein a rectangular dielectric housing made of acrylic plastic is depicted in transverse cross-section. This figure schematically shows one experimental set-up used to demonstrate the invention. Plastic panels form four housing walls of quarter-inch thickness to form a rectangular box 48 inches long, 5¾ inches wide and 6½ inches high. Slab electrodes 92, 94, each 38 inches long and 5¾ inches wide are spaced apart a distance of 5¾ inches. Forty-eight inch long three-sided plastic bars 96 and 98 glued to laterally spaced lucite panels form the housing's side walls that each form two sloping surfaces. Vanes 104, 106, 108 and 110 form two sets of companion vanes 104, 110 and 106, 108 that follow the sloping surfaces of bars 96, 98. The vanes make electrical connection to a respective electrode 92, 94 in a manner previously explained with reference to FIG. 1. Conductive pins for this purpose are depicted but not given a number in FIG. 4.

The contoured companion vanes on each side of the discharge region converge to define between them a minimal area current loop when the vanes are used to carry current during deliverance of power to the device electrodes. Thus, pairs of the contoured vanes slope in a fashion that they delineate the electric field created when a potential difference is applied across the discharge region via the electrodes and companion vanes and establish favorable field gradients throughout the entire discharge region so that any wall of dielectric material bordering the discharge region will not sustain tracking of a discharge. Four 16 inch wide, thin, flexible aluminum sheets 114, 116; 118, 120 are attached in bonnet fashion to a three sheet strip line. Sheets 114, 120 and sheets 116, 118 are separated by a thin layer of electrical insulation material. Lead 124 of the strip line connects to a triangular metal block 126 surmounting a dielectric body 28 resting upon the housing. Lead 124 of the strip line connects via block 126 to aluminum sheets 114, 116 which in turn connect to upper vanes 104, 106. Lead 132 of the strip line connects to aluminum sheet 120 that connects to vane 110. Lead 134 connects to aluminum sheet 118 that connects to vane 108. A railgap switch 136 in lead 124 performs the required switching. A pulse forming network (PFN) of discrete elements connects with leads 124, 132, 134 and switch 136. The PFN includes six capacitors 138 totaling 0.16 microfarads. A first marx bank 140 connects to the strip line lead 124 to pulse charge capacitors 138. The PFN has an impedance of 1.1 ohms. Inductors 142 represent the inductance of lead 124. The PFN is capable of delivering a relatively square voltage pulse into a matched dummy load (not shown). A prepulse circuit 144 is used to initially break down the gas, typically a XeCl mixture, contained in the discharge region within the housing, when a discharge is to be initiated. Circuit 144 is a second marx bank of 5 nanofarad (nF) capacitance and 100 KeV maximum output voltage connected to strip line lead 24 with a 50 ohm coaxial cable 146. Prepulse rise-time is 80 nanosecond. An e-beam X-ray generator 148 located directly below the housing sends X-rays through the dielectric bottom wall of housing 90 and through lower electrode 94 into the discharge region to effect preionization of the gas in the discharge region in the housing before discharge is initiated. A convex metal bar 50 resting on lower electrode 94 tends to center a discharge path at the middle of electrodes 92 and 94, away from the electrode's edges.

The vane arrangements shown in FIGS. 1 through 4 divide the device discharge region into four quadrants that together form the discharge region. Each quadrant contains an electrode edge close to dielectric wall material affording a surface proximal the electrode edge which benefits from a freedom from discharge tracking achieved by vane influence on the field gradient, intensity and direction near the electrode edge in the discharge region.

Each vane acts electrostatically to greatly reduce the probability of discharge tracking by eliminating altogether any field enhancements that would initiate tracking, or by greatly reducing the magnitude of any such field enhancement so that it is insufficient to initiate tracking action. The geometry of the vanes also sets the equipotential boundaries such that the field is shaped so that charged particles are not accelerated from an electrode toward the walls, but rather towards the center of the discharge.

The vanes remove side effects of the electrode edge geometry found in the prior art by effectively expanding the width, or lateral dimensions of the housed electrodes so that lateral margins of the field are distant from the discharge region and are remote from the electrode edges.

The electric field in the described devices may be obtained by any means equivalent to the structural combination described above.

Advantages of the invention are that the inductance of the discharge can be significantly reduced below that achieved with prior designs, so that the current rise time can be much shorter. This is particularly important in large volume excimer lasers, where the total discharge pulse length is limited and the rise time may be a significant fraction of, or even equal to, the pulse length. In these cases the efficiency of the laser will be severely reduced, and in extreme cases lasing may not occur. Furthermore, since the inductance is reduced over previous designs, a shorter pulse length can be used for a given volume of discharge, so that higher peak power may be achieved Of course, the invention is applicable to any large area discharge. High power switch devices, for example, may utilize the invention. Because the invention has immediate application to excimer lasers, the invention has been discussed with reference to such lasers.

Obviously, numerous modifications and variations of the invention are possible in light of the above teachings. It is therefore to be understood that within the scope of the appended claims, the invention may be practiced otherwise than as specifically described herein.

We claim:

1. A transverse discharge device structure for use in a laser, comprising:

dielectric wall material forming a housing about a discharge region;

two discharge electrodes disposed in spaced relation within said region, the region supporting an electric field between the electrodes when they are energized by a potential difference applied to the electrodes; and means for imparting a particular configuration to the electric field characterized by a pattern of equipotential lines essentially free of field enhancements and field directions that would accelerate charged particles from the discharge region toward the dielectric wall material, the means comprising two conducting vanes situated outside the housing to one side of said discharge electrodes.

2. The structure set forth in claim 1 wherein each electrode is a slab electrode.

3. The structure set forth in claim 1 wherein said dielectric wall material comprises solid, liquid, gas, or a combination of at least two of them.

4. The structure set forth in claim 1 wherein said means further comprises two additional conducting vanes situated outside the housing on another side of said discharge electrodes.

5. The structure set forth in claim 1 wherein said discharge region contains pressurized gas.

6. The structure set forth in claim 1 wherein said discharge region contains a rare gas halide laser mixture.

7. The structure set forth in claim 1 wherein said discharge region contains argon.

8. The structure set forth in claim 1 wherein said two vanes slope toward each other in a laterally outward direction from said two electrodes.

9. The structure set forth in claim 4 wherein said two additional conducting vanes slope toward each other in another laterally outward direction from said two electrodes.

10. In a discharge device, structure for use in a laser comprising:
dielectric wall material forming a housing about a discharge region;
two discharge electrodes disposed in spaced relation within said region, the region supporting an electric, field between the electrodes when they are energized by a potential difference applied to the electrodes; and
means for imparting a particular configuration to the electric field characterized by a pattern of equipotential lines essentially free of field enhancements and field directions that would accelerate charged particles from the discharge region toward the dielectric wall material, the means comprising two conducting vanes situated outside the housing alongside one of the discharge electrodes and a nearby portion of a dielectric wall material alongside the discharge region.

11. The structure set forth in claim 10 wherein the one electrode is a slab electrode.

12. The structure set forth in claim 10 wherein the dielectric wall material comprises solid, liquid, gas, or a combination of at least two of them.

13. The structure set forth in claim 10 wherein said means further comprises two additional conducting vanes situated outside the housing alongside another one of the discharge electrodes.

14. The structure set forth in claim 10 wherein said discharge region contains pressurized gas.

15. The structure set forth in claim 10 wherein said discharge region contains a rare gas halide laser mixture.

16. The structure set forth in claim 15 wherein said discharge region contains argon.

17. The structure set forth in claim 10 wherein said two vanes slope laterally outward from the one electrode.

18. The structure set forth in claim 13 wherein said two additional vanes slope laterally outward from said another discharge electrode.

19. A transverse discharge device structure of low inductance for use in a laser comprising:
two vanes of broad sheet metal symmetrically arranged on respective sides of an upper electrode having long side edges, both vanes extending away from proximal side edges of said electrode;
another two vanes of broad sheet metal symmetrically arranged on respective sides of a lower electrode having long side edges, both vanes extending away from proximal side edges of said lower electrode;
a body of dielectric material interposed between all of the vanes and a central discharge region situated between said upper and lower electrodes, said body bounding said discharge region close to said long side edges of said upper and lower electrodes,
said vanes forming respective pairs that are effective to delineate shape, size, location and distribution of an electrical field that exists during initiation of a discharge between said upper and lower electrodes.

20. In a transvere discharge device, structure for use in a laser comprising:
a dielectric wall material forming a housing defining a discharge region;
two discharge electrodes disposed in spaced relation in said discharge region; and
means for reducing inductance of said device by bringing energy in from two sides of the device perpendicular to the plane of a discharge between said electrodes so as to eliminate electrode field enhancement and wall surface flashover.

21. In a transverse discharge device, structure for use in a laser comprising:
an elongated housing of rectangular cross-section enclosing an elongated chamber having two slab electrodes separated by a discharge region running the length of said chamber;
opposed side walls of said housing flanking respective lateral edges of said slab electrodes and being in proximal relation thereto so that the volume of said discharge region is limited by said side walls;
said slab electrodes being generating electric field in said discharge region when a potential difference is applied across said slab electrodes; and
means for shaping the electric field to a particular pattern within said discharge region which pattern ensures that no charged particle in the electric field is accelerated toward either side wall when discharge initiation is effected by generating the electric field between said slab electrodes.

22. In a low-inductance transverse discharge device, structure comprising:
elongated electrodes mutually aligned along an elongated housing chamber, large-size, broad metal vanes located outside a housing defining said chamber to delineate an electric field pattern in a chamber region bordered by said two electrodes, dielectric walls of the housing being outwardly flared to form tapered surfaces sloping to accommodate said metal vanes which contact flared wall portions and converge in an outward direction toward a plane midway between said electrodes.

* * * * *